(12) United States Patent
Takada et al.

(10) Patent No.: US 7,894,817 B2
(45) Date of Patent: Feb. 22, 2011

(54) COMMUNICATION SYSTEM USING MULTIPLE WIRELESS RESOURCES DURING A SOFT HANDOFF

(75) Inventors: May Takada, Koganei (JP); Yosuke Takahashi, Yokohama (JP); Shiro Mazawa, Fujisawa (JP); Rintaro Katayama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 886 days.

(21) Appl. No.: 11/822,228

(22) Filed: Jul. 3, 2007

(65) Prior Publication Data

US 2008/0057970 A1   Mar. 6, 2008

(30) Foreign Application Priority Data

Aug. 31, 2006   (JP)   ............................. 2006-234897

(51) Int. Cl.
- H04B 1/18    (2006.01)
- H04W 72/00   (2009.01)
- H04W 40/00   (2009.01)

(52) U.S. Cl. .................... 455/446; 455/166.2; 455/447; 455/450; 370/209; 370/252; 370/331; 370/335; 375/130

(58) Field of Classification Search .............. 455/166.2, 455/446, 447, 450; 370/209, 252, 331, 335; 375/130

See application file for complete search history.

(56) References Cited

U.S. PATENT DOCUMENTS

| 6,175,736 | B1 | 1/2001 | Lee et al. | |
|---|---|---|---|---|
| 6,356,528 | B1 * | 3/2002 | Lundby et al. | ............... 370/209 |
| 6,496,531 | B1 * | 12/2002 | Kamel et al. | ................. 375/130 |
| 6,708,036 | B2 * | 3/2004 | Proctor et al. | ............... 455/446 |
| 7,158,498 | B2 * | 1/2007 | Lundby et al. | ............... 370/335 |
| 7,542,448 | B2 * | 6/2009 | Qi et al. | ....................... 370/331 |
| 7,548,752 | B2 * | 6/2009 | Sampath et al. | ............. 455/447 |

(Continued)

OTHER PUBLICATIONS

"cdma2000 High Rate Packet Data Air Interface Specification", $3^{rd}$ Generation Partnership Project 2 "3GPP2", 3GPP2 C.S0024, Version 2.0, Oct. 27, 2000, 8-100-8-103.

(Continued)

*Primary Examiner*—William D Cumming
(74) *Attorney, Agent, or Firm*—Stites & Harbison, PLLC; Juan Carlos A. Marquez, Esq (57) ABSTRACT

In a wireless communications system operating according to CDMA or the like, when one terminal simultaneously performs communication using multiple wireless resources (e.g., multiple carriers), there was a problem that when it was attempted to guarantee network mobility by the same soft handoff system as in the case where communication was performed using only one wireless resource, efficiency suffered from the viewpoint of network forwarding load, processing load and wireless resource occupancy time. Soft handoff termination is judged and soft handoff is forcibly terminated according to whether or not the data rate obtained for all resources on the network side satisfies a requested rate, based on a reception state notification from a terminal concerning wireless resources. By performing this processing, the soft handoff period is shortened, sufficient received strength in the terminal is maintained and terminal mobility is guaranteed, while at the same time network forwarding load, terminal processing load and wireless resource occupancy time are suppressed to the absolute minimum.

12 Claims, 12 Drawing Sheets

U.S. PATENT DOCUMENTS

| | | | |
|---|---|---|---|
| 7,668,518 B2* | 2/2010 | Chen | 455/166.2 |
| 2002/0036980 A1* | 3/2002 | Lundby et al. | 370/209 |
| 2003/0003918 A1* | 1/2003 | Proctor et al. | 455/446 |
| 2006/0135169 A1* | 6/2006 | Sampath et al. | 455/447 |
| 2007/0076663 A1* | 4/2007 | Qi et al. | 370/331 |
| 2007/0218913 A1* | 9/2007 | Chen | 455/450 |
| 2008/0057970 A1* | 3/2008 | Takada et al. | 455/450 |
| 2010/0002597 A1* | 1/2010 | Sampath et al. | 370/252 |

OTHER PUBLICATIONS

Office Action from Chinese Patent Office for Chinese Application 2007101270417 mailed Dec. 25, 2009.

* cited by examiner

COMMUNICATION SYSTEM USING MULTIPLE WIRELESS RESOURCES DURING A SOFT HANDOFF

CLAIM OF PRIORITY

The present application claims priority from Japanese application JP 2006-234897 filed on Aug. 31, 2006, the content of which is hereby incorporated by reference into this application.

FIELD OF THE INVENTION

The present invention is suitable for wireless communications systems terminals and base stations that support terminal mobility such as mobile phones and wireless LAN, and particularly, for those using MC-CDMA (multi carrier code division multiple access).

BACKGROUND OF THE INVENTION

Wireless communications systems such as mobile phones aim to enable communication "anytime and anywhere" without interruption, and have developed to support the expansion of communication areas and handoff technology between base stations.

Recently, the data amount being exchanged by a single user has been rapidly increasing, such as E-mails with photographic or moving image files attached, and motion picture of Video phones for example. Wireless communication systems are required to enable further enhancement of maximum data throughput.

Also, new wireless communications systems with lower terminal mobility but higher data throughput (close to cable network level), such as Wireless LAN or WiMAX and the like, are now appearing. Thus, there is a pressing need to achieve balanced mobility and higher data throughput for future mobile phone systems.

SUMMARY OF THE INVENTION

In order to obtain higher data throughput, whereas communication with the base station was previously made through only one carrier frequency, it is now being considered to increase the communications throughput N times by permitting communication via multiple carriers for 1 user simultaneously. For instance, 1xEVDO method of 3GPP2 (3GPP2 C.S0024-A_v2.0 (8.7.6.1.6.3, Active Set Maintenance)) is a communication standard for the Code-Division Multiple Access system that uses one carrier. If you try to enhance the communication capability for each terminal N times by using N carriers with the conventional soft handoff method, the efficiency and the stability will become problems. In the following, these problems are described in detail.

To resolve this issue, it is necessary to understand the basic method of the soft handoff. Method to guarantee terminal mobility in the case of using one carrier will be discussed first.

Figure 4:
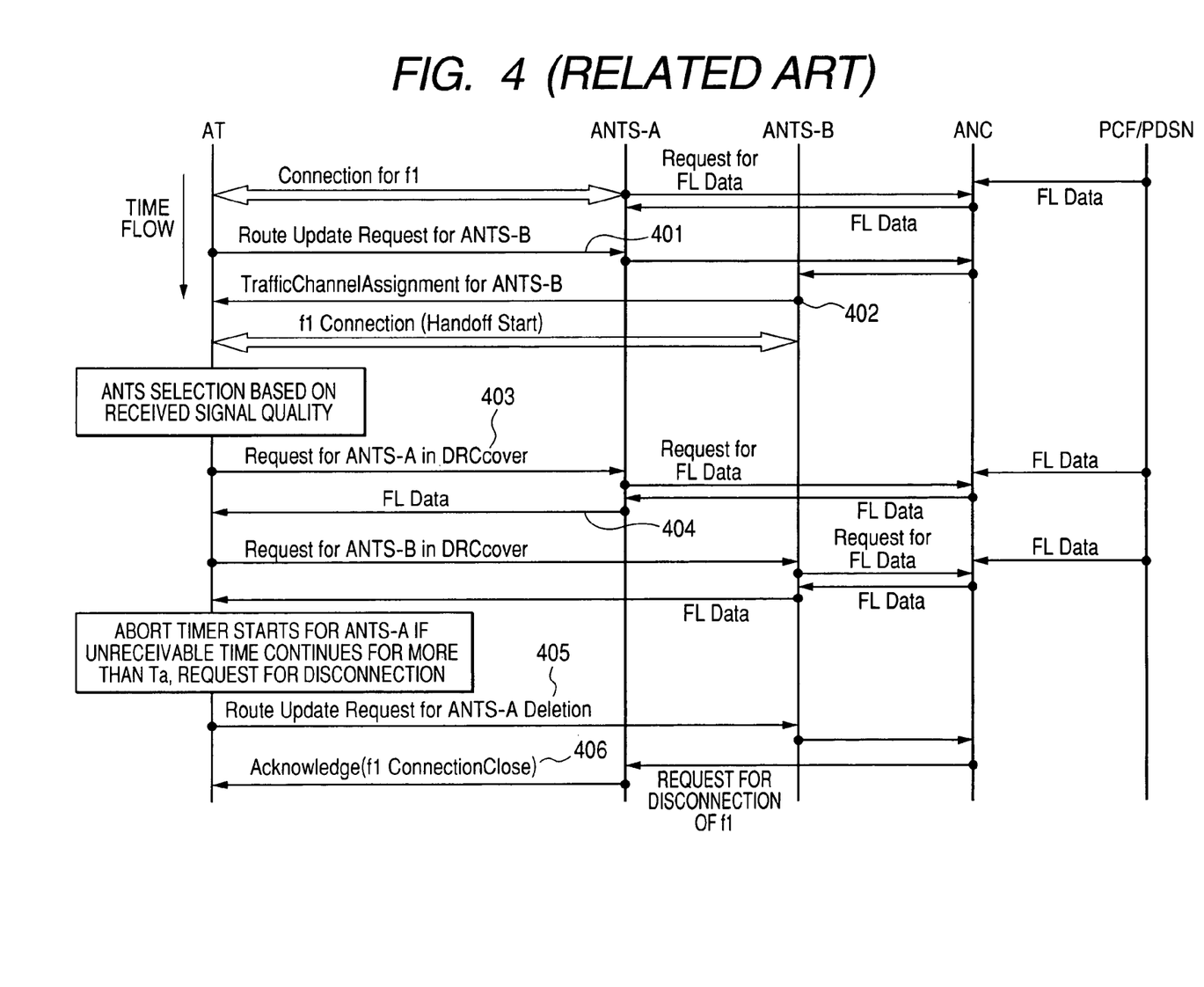
FIG. 4 is a flow chart of soft handoff in a prior art carrier system.

In conventional 1xEVDO system, terminal mobility is guaranteed by using a method called soft handoff between base stations, whereby communication is not interrupted even if the terminal moves to a communication area of another base station adjacent to the first communication area. In soft handoff, multiple base stations in adjacent communication areas cooperate, and a series of downlink transmission data is distributed to one terminal alternately from multiple base stations. Although the received strength of the pilot signal from each base station in the terminal changes momentarily due to fading or movement of the terminal, the base station with the best received condition is selected from among multiple candidates so that data is always sent under good received conditions (without breaking off the communication). Details of the soft handoff method will now be described using 3GPP2 C.S0024-A_v2.0 (8.7.6.1.6.3—Active Set Maintenance) and FIG. 4. In FIG. 4, the procedure when soft handoff is performed, is shown sequentially.

Sequence (401)

The terminal and base station manage a list of near-by base stations, called an Active Set of that terminal, having the downlink (base station→terminal) pilot signal received strength greater than a threshold. The Active Set is managed by the terminal before communication starts, and by a controller (ANC) connected on the base station side of the network after communication starts. When the pilot signal received strength from another new base station (ANTS-B) is detected higher than a threshold while communicating with a certain base station (ANTS-A), the terminal (AT) transmits a Route Update message (401), and requests that ANTS-B be added to the ActiveSet of the terminal managed by ANC.

Sequence (402)

When ANC receives the request (401) via ANTS-A, it prepares to deliver downlink transmission data addressed to the terminal not only to ANTS-A, but also to ANTS-B (i.e., soft handoff is started), and instructs resource allocation of wireless channels in ANTS-B required for sending and receiving to and from that terminal.

When the allocation is possible, the Active Set of the terminal is updated, and this is notified to the terminal via ANTS-A (402). ANTS-B then starts to communicate with the terminal.

Sequence (403)

The terminal selects the base station with the best receiving condition from among the base stations registered in the Active Set of the terminal, and specifies an base station ID in a DRCCover or DSC signal contained in the uplink (terminal →base station) channel.

Sequence (404)

After the passage of a constant offset time, the base station specified by DRCCover or DSC starts downlink data transmission to the terminal.

Sequence (405)

The terminal monitors the received strength of the pilot signal from each base station included in the Active Set. When the received strength from a base station (ANTS-A) falls below the threshold longer than a fixed time, a Router Update message is transmitted, and it is requested that ANTS-A be deleted from the ActiveSet of the terminals managed by ANC.

Sequence (406)

When ANC receives the request (405) via ANTS-A or ANTS-B, it terminates soft handoff procedure, and after updating the Active Set, it instructs ANTS-A to disconnect communication with the terminal. After receiving this instruction, ANTS-A disconnects communication with the terminal.

Figure 1:
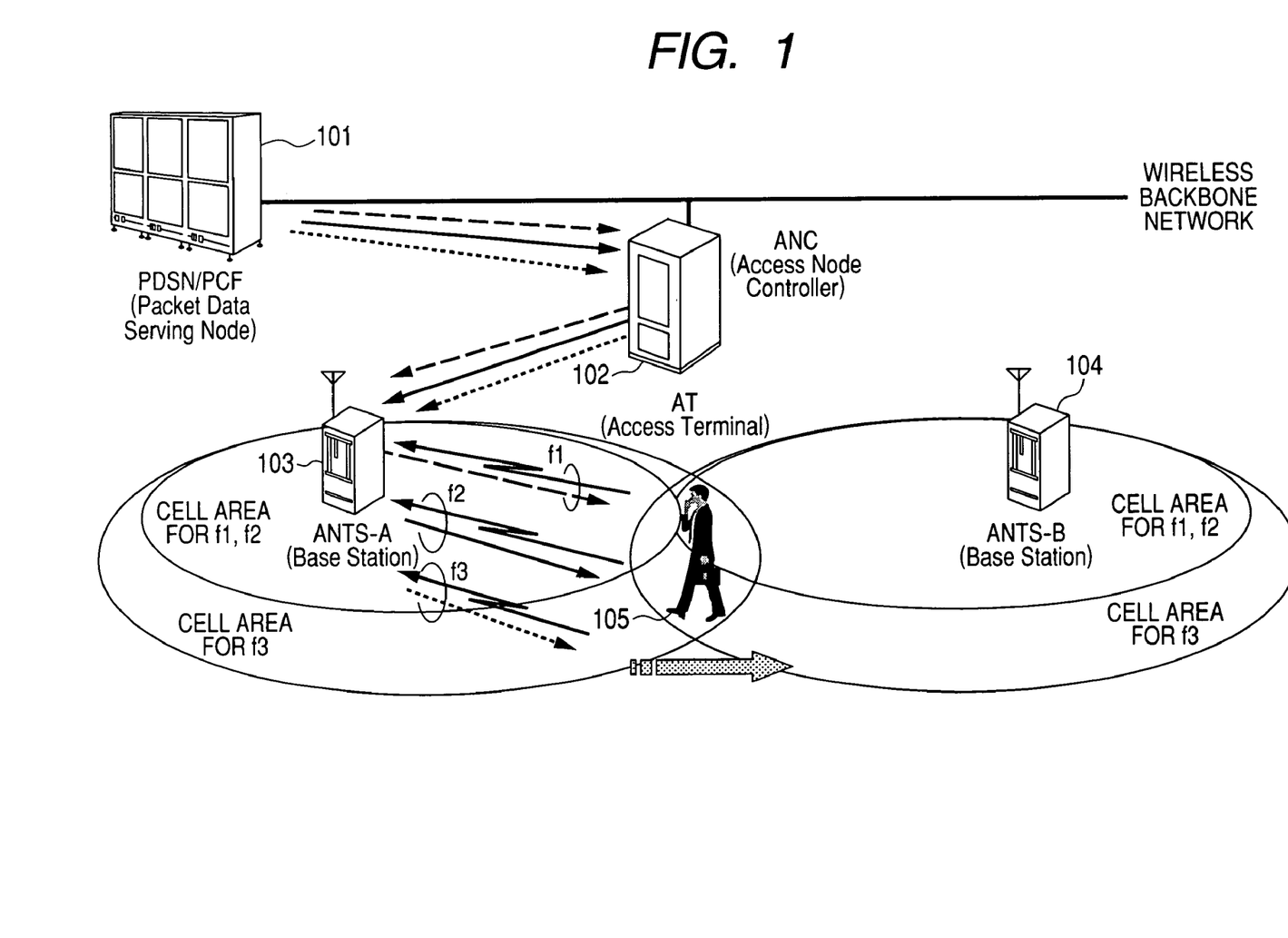
FIG. 1 shows how communication is performed during soft handoff while simultaneously communicating via three carriers in a first network configuration.
Figure 2:
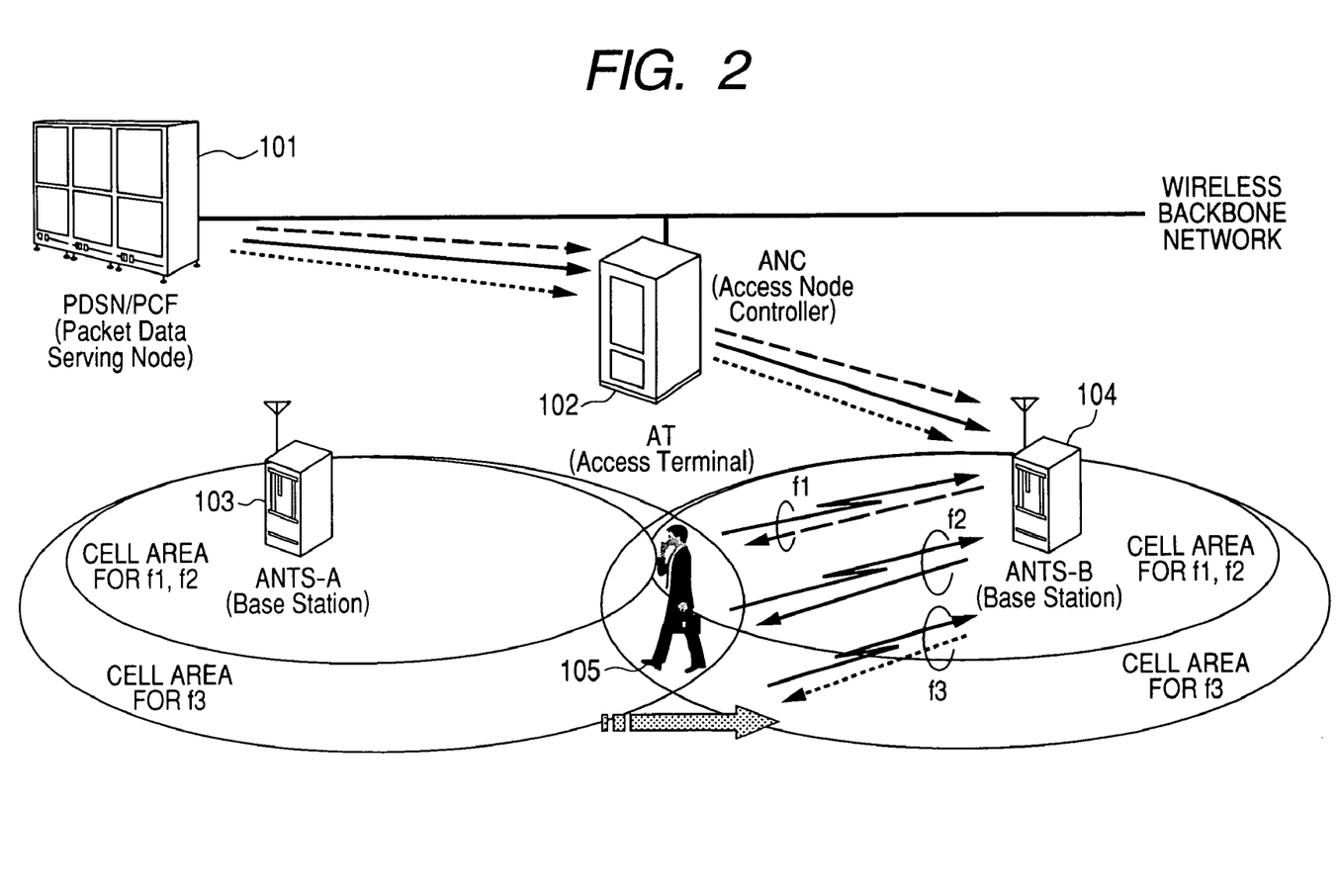
FIG. 2 shows soft handoff for all carriers during simultaneous communication via three carriers in the first network configuration.

Next, a soft handoff method expanded to multiple carriers for increasing the maximum throughput, will be considered. As an example of a network configuration, FIG. 1 shows an example of communication with the base station wherein one terminal uses three carriers frequencies at the same time. Downlink transmission data for the carrier frequencies f1-f3 is passed from a PDSN (Packet Serving Data Node) 101 via the ANC 102 (Access Node Controller) that is the control node of the base station, and is transmitted from the ANTS (Access Node Transmission System)-A103 to an AT (Access Terminal) 105. Here, the aforesaid base station corresponds to ANTS and the terminal corresponds to AT. The AT (and the user who is using that terminal) 105 moves from the cell area of ANTS-A 103 to the cell area of ANTS-B104. Since radio waves are attenuated depending on the propagation distance, the signal received from ANTS-A103 gradually becomes weaker. At the same time, soft handoff procedure occurs in each carrier, and finally, there is a shift to communication between the three carriers and ANTS-B104 as shown in FIG. 2. Soft handoff is performed in a transitional situation wherein AT is present in the cell area of both ANTS between the aforesaid two states.

The simplest way to shift from the state in FIG. 1 to the state in FIG. 2 is a simultaneous soft handoff in all carriers altogether. However, reception characteristics of the terminal deteriorate if soft handoff is performed for all carriers at the same time. In the worst case, there is a possibility that communication will be disconnected. This is because, if in multi-path condition, the propagation path has frequency selectivity, meaning that the propagation path is different for carriers of different frequency. Therefore the pilot received strength fluctuation at the terminal is different for every carrier (even if ANTS-B has a higher received strength than ANTS-A at two frequencies f1, f2, it does not necessarily mean that the ANTS-B is higher for f3 at the same time). Further, in a wireless system, it may occur that the transmission strength from the base station is different for each carrier, and that the frequency reuse pattern in an adjacent base station is different. Due to above, when there is soft handoff for all carriers at the same time, reception characteristics may deteriorate and communication may be disconnected.

Figure 3:
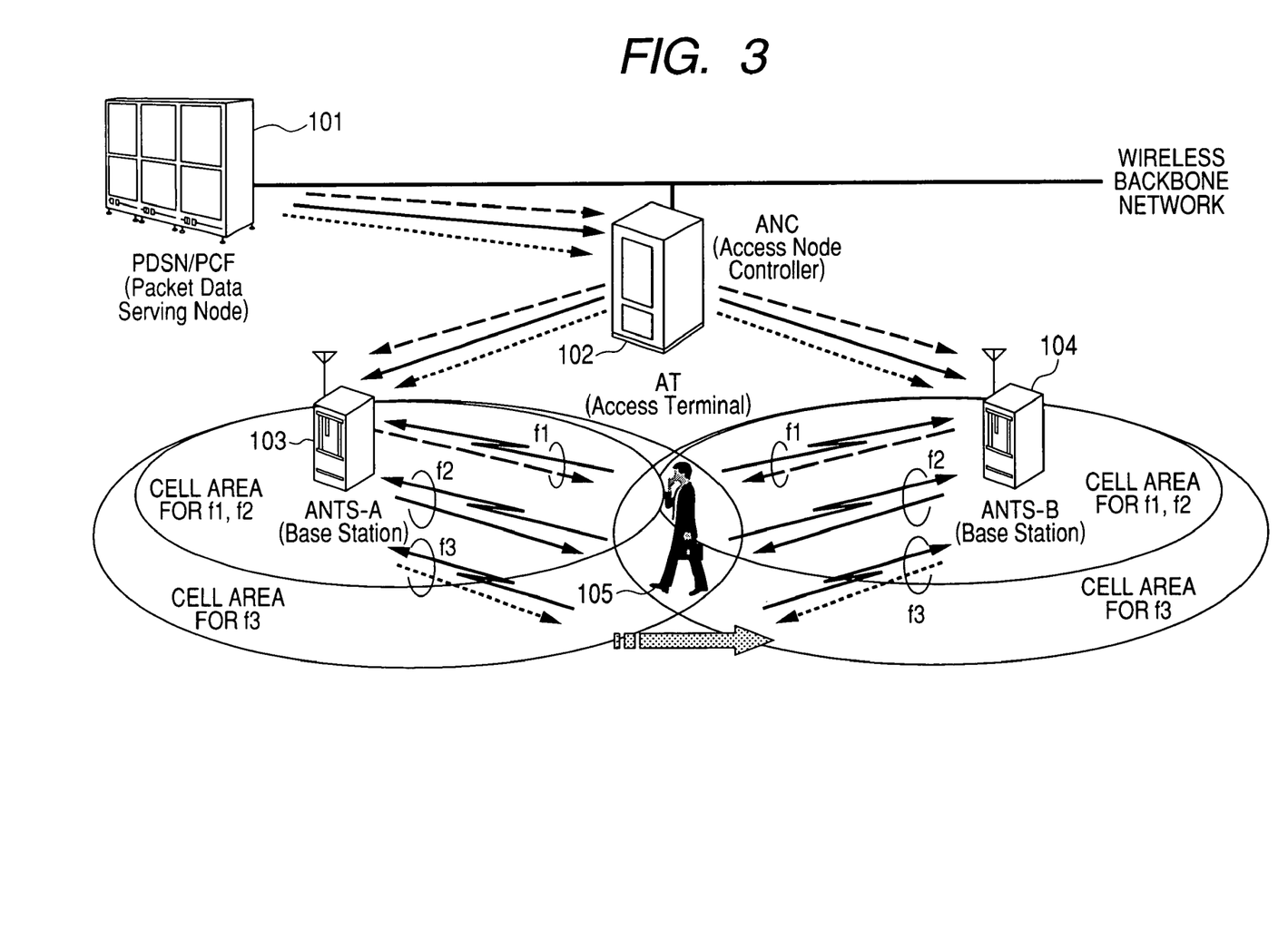
FIG. 3 illustrates how communication is performed during forced soft handoff termination from the network side during simultaneous communication via three carriers in the first network configuration according to the invention.

Would the above mean that soft handoff should be performed independently for each carrier? Actually, no. During hand off, wireless resources and device resources are consumed by multiple wireless stations. For example, if two base stations are in a handoff state for three carriers as shown in FIG. 3, control must be performed by AT105 for a total of 6 carriers at most, so the battery life is reduced by the amount of increased processing which must be performed. Also, since wireless channel resources equivalent to a total of 6 carriers are used by one terminal, if the soft handoff state persists for a long time, the resource will not be shared effectively among multiple users, so the usage efficiency of the whole system decreases.

Figure 8:
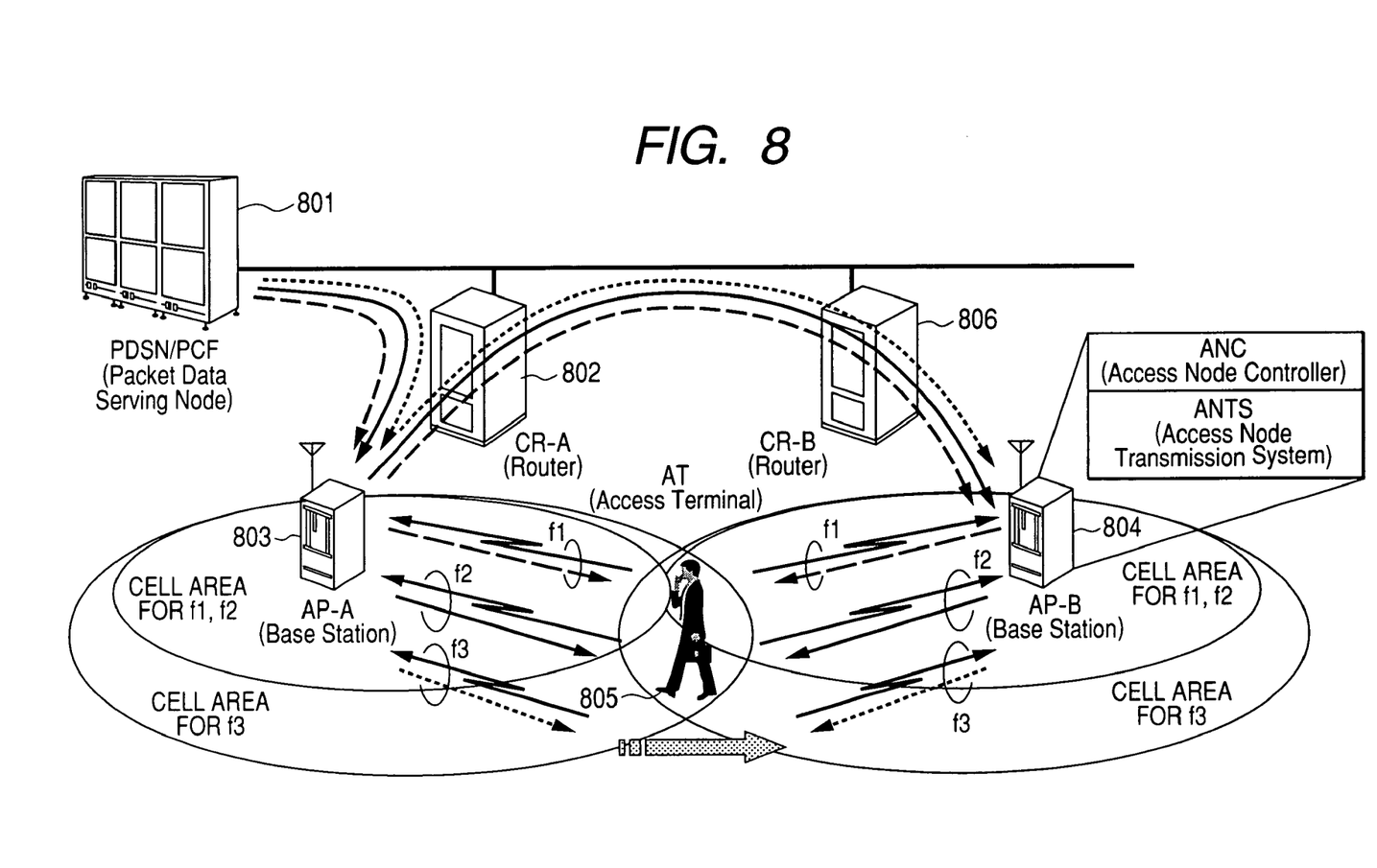
FIG. 8 illustrates how communication is performed during soft handoff during simultaneous communication via three carriers in the second network configuration.

Next, soft handoff in a second network configuration will be described using FIG. 8. In this configuration, ANC is installed in each AP, and APs are connected by a CR (Router). Downlink circuit transmission data at the carrier frequencies f1-f3 is passed from the PDSN (Packet Data Serving Node) 801 via CR-A (Router), and is first transmitted from an AP (Access Point)-A803 to an AT (Access Terminal) 805. The AP 803 (804) has functions corresponding to both ANC 102 and ANTS 103 in FIGS. 1-3. In this configuration, when soft handoff is performed, ANC in AP-A803 is the main element which forwards data to AP-B 804 via CR-A 802 and CR-B 806, and soft handoff is performed between AP-A 803 and AP-B 804 which are contained in the Active Set of the terminal 805. In this configuration also, if the soft handoff state persists for a long time, network resources are consumed due to forwarding of data between AP-A 803 and AP-B 804, and it was therefore important to reduce the soft handoff procedure time.

Summarizing, it is therefore an object of the present invention, which aims to resolve the above problems, to provide a terminal mobility guarantee which offers sufficient performance in MC-CDMA, and which is effective. The invention is applicable not only to MC-CDMA, but has the same effect in a wireless communications system using a multiplexing technique such as OFDMA, OFDM or OFCDMA provided that the system is such that one terminal can communicate with a base station using multiple wireless resources, or soft handoff is performed between multiple base stations.

In the present invention, based on a receiving state notification concerning wireless resources from a terminal, soft handoff is forcibly terminated based on whether or not the data rate obtained for all resources on the network side satisfies a predetermined rate.

According to an embodiment of the present invention, a soft handoff period when one terminal communicates using multiple carriers at the same time is shortened, sufficient received strength in the terminal is maintained, and the mobility of the terminal is guaranteed, while on the other hand, a network forwarding load, terminal processing load and wireless resource allocation time can be suppressed to the minimum.

DETAILED DESCRIPTION OF THE PREFERRED EMBODIMENTS

Embodiment 1

Figure 5:
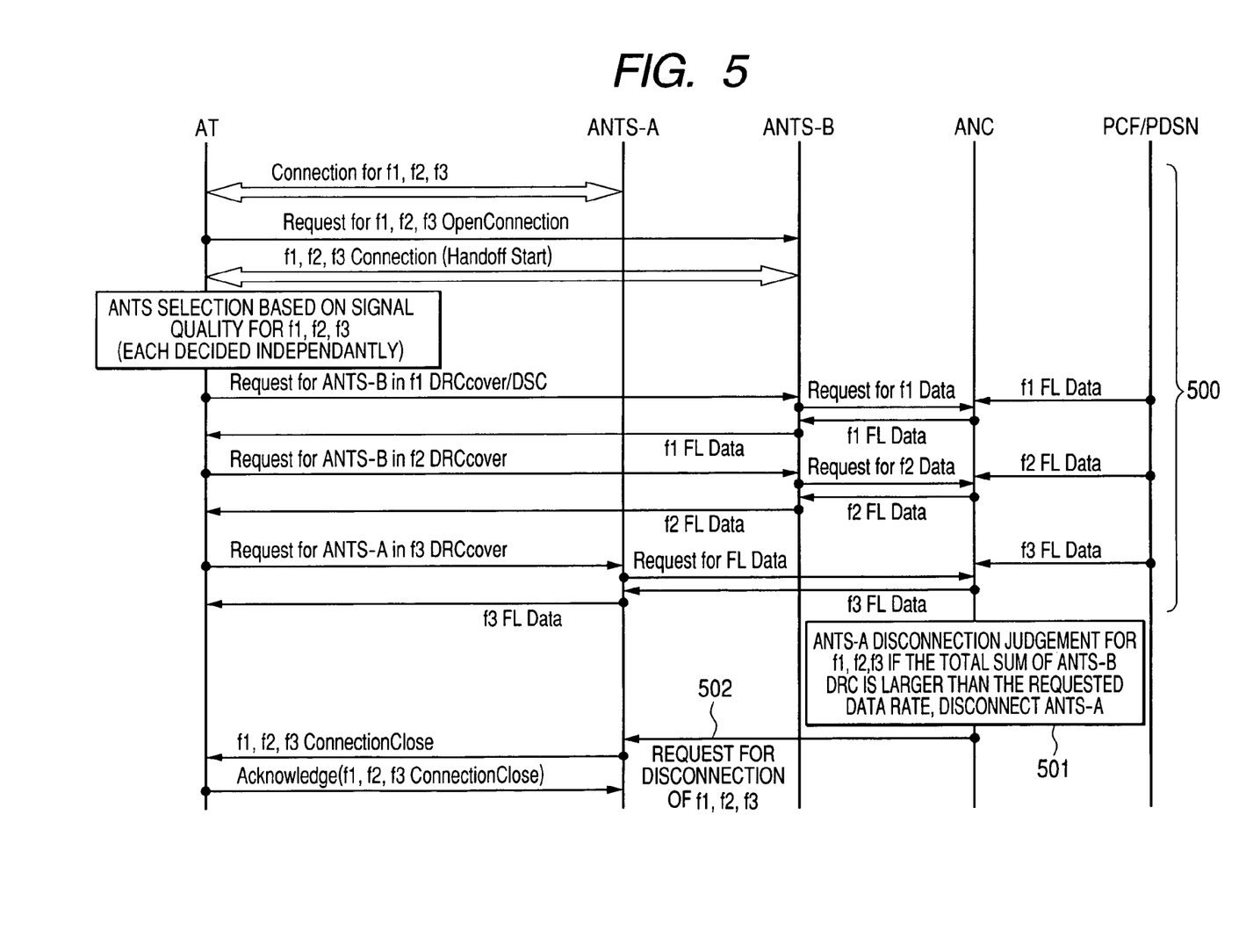
FIG. 5 is a flow chart showing a procedure in the first network configuration according to a first embodiment of the invention.

A first embodiment of the present invention will now be described referring to FIG. 5. In this embodiment, a first example of a network configuration is shown in FIG. 3. In this embodiment, the salient points are that soft handoff termination is periodically determined, and stability is maintained while redundant soft handoff is avoided. To ensure above points, soft handoff is terminated on the basis of the following sequences.

Sequence (500)

It is assumed that soft handoff is performed at three frequencies (f1, f2, f3). The procedure for this will be described. Soft handoff at these frequencies may be performed at the same time, or soft handoff may be performed one by one according to the propagation situation. The Active Set of each terminal is managed for each carriers. This is in agreement with sequences (401)-(404) described in FIG. 4. The messages for f1-3 up to sequence (501) show that for carriers f1 and f2, since the receiving signal quality from ANTS-B is better, data is received from ANTS-B, and for carrier f3, since the receiving signal quality from ANTS-A is better, data is received from ANTS-A.

Sequence (501)

In the soft handoff state between multiple carriers, soft handoff termination judgments described later are performed periodically in ANC.

Sequence (502)

A case will now be considered where, in ANC, it is determined that overall communication quality is sufficient even if terminal AT performs communication only with ANTS-B for carriers f1-f3. At this time, even if the reception quality of ANTS-A is still better for carrier f3 and an ANTS-A disconnection request by a RouteUpdate message has not yet been received from the terminal, ANC instructs ANTS-A to disconnect the communication with the terminal for all carriers f1-f3. ANTS-A which received these instructions transmits a ConnectionClose message which instructs AT to terminate the communication, and AT which received this message disconnects communication with ANTS-A, after returning an Acknowledgement. ANC then deletes ANTS-A from the ActiveSet managed respectively for each of the carriers f1-f3, and notifies the update to the terminal via ANTS-B.

In ANC, in a predetermined period after soft handoff was forcibly terminated, no addition is made to the ActiveSet, even if a RouteUpdate message to ANTS-A is again sent from a terminal. Alternatively on the terminal side, in a predetermined period, even if the received strength from ANTS-A is more than a threshold, a RouteUpdate message is not transmitted. The latter method has the advantage that wireless resources are not consumed due to unnecessary exchange of messages, and a higher efficiency is obtained.

Soft handoff termination conditions as in the prior art were independent for each carrier, and soft handoff termination conditions were not determined in view of multiple carriers. However, in one embodiment according to this invention, in ANC, if a soft handoff termination judgment is performed periodically and specific conditions are met, soft handoff is forcibly terminated from the network side regardless of the state of each carrier, the soft handoff period is shortened, and an improvement in the operating efficiency of wireless resources and reduction of terminal battery consumption are thereby attained.

Figure 6:
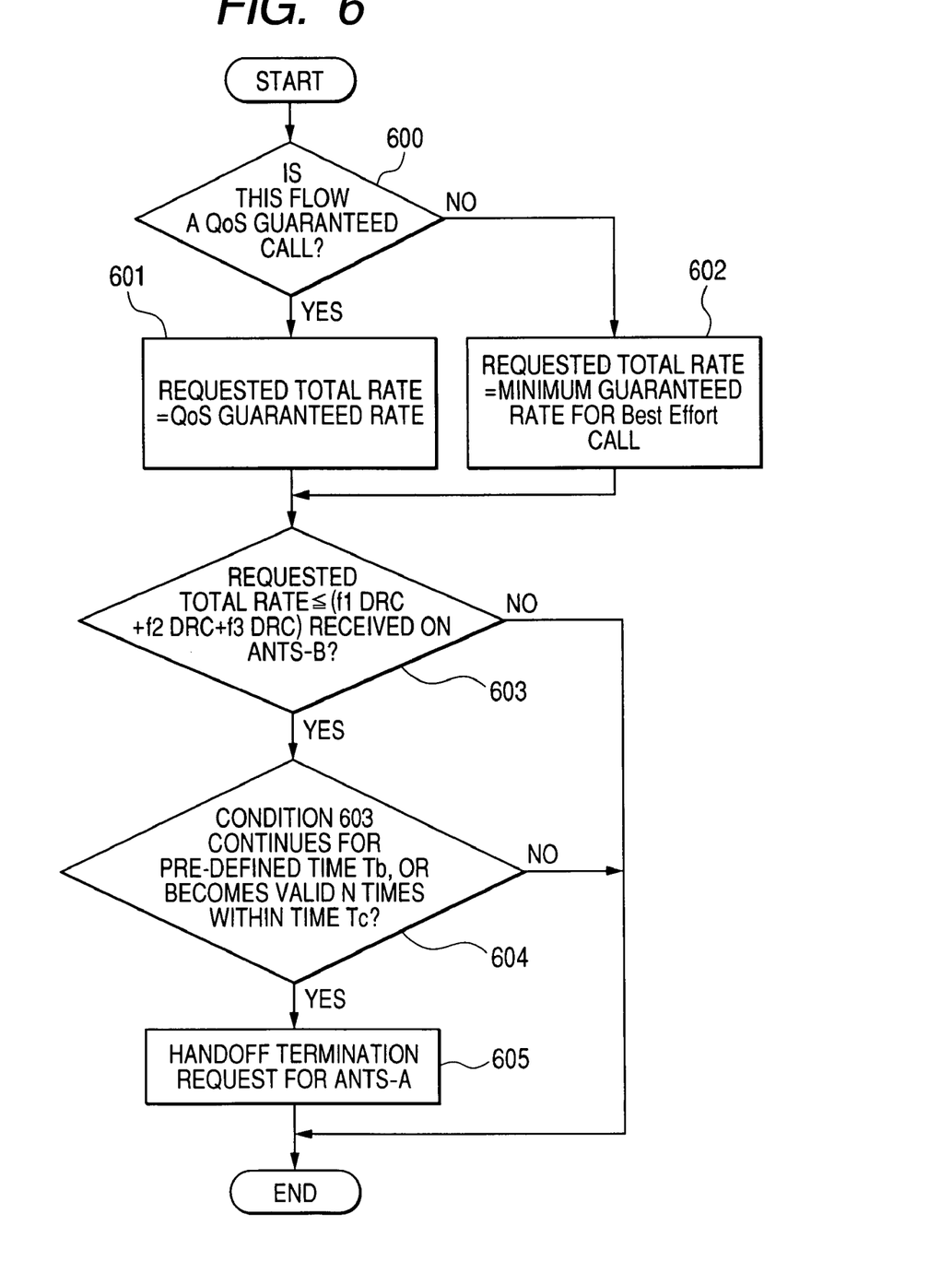
FIG. 6 is a flow chart showing a procedure of soft handoff termination in a method according to the first embodiment of the invention.

FIG. 6 shows an example of a flow chart of a soft handoff termination judgment in ANC in the aforesaid embodiment. As a precondition, it is assumed that send/receive data for all the carriers f1-f3 belongs to the same data flow (hence, one data flow is actually distributed to, and transmitted to and received from, three carriers). It is assumed also that ANC has information about the reception rate requested by the terminal with respect to the aforesaid data flow, or that it has a judgment threshold corresponding to a preassumed request rate.

Step 600

A judgment about the request rate is made. If the data flow which is the object of judgment is a QoS call which guarantees a predetermined QoS, the routine proceeds to a Step 603, and if it is anything other than a QoS call, the routine proceeds to a Step 604.

Step 601

When the data flow is determined to be a QoS call, it is assumed that the rate which should be guaranteed by QoS for the data flow is a requested sum total rate for all the carriers of this terminal.

Step 602

If it is anything other than a QoS call, the data flow is assumed to be a best effort call, and it is assumed that the minimum guaranteed rate predetermined for a best effort call is the requested sum total rate for all the carriers of this terminal.

Step 603

ANC can acquire DRCCover or DSC notified from the terminal via the base station ANTS-A or ANTS-B for each carrier, and the accompanying DRCRate (specification of the maximum data rate and communication format which the terminal can receive). DRCCover or DSC is uplink control information which specifies a base station with the best receiving state among the base stations registered in the ActiveSet of the terminal.

Based on the above information, ANC estimates the possible maximum throughput rate which is the sum total for all carriers for the handoff target base station (ANTS-B). An example for an effective estimation method is, to maintain DRCRate when DRCCover or DSC specifies the handoff target base station (ANTS-B) for a specified time, and compute an average estimated rate over a specified time. The characteristic of this invention is to estimate a total value for all carriers of this terminal from the estimated rate for each carrier. Various methods can be used in estimation of the above, depending on the purpose and within the scope of the invention. It is then determined whether or not the estimated rate which can be received which is the sum total for all carriers, exceeds the requested total rate.

Step 604

Even if, as a result of Step 603, the requested total rate is instantaneously exceeded, it may also fall below the requested total rate due to a change in the propagation path. However, once soft handoff is terminated, it is necessary to resume communication with ANTS-A immediately and to exchange control messages between the base station and terminal repeatedly to return to the soft handoff state (this operation is called "disconnection return"), and a long processing time is therefore required. The reception quality in the terminal not only deteriorates, but the network transmission load and terminal processing load increase, and the utilization efficiency of wireless resources falls. Hence, after verifying that the requested sum total rate can be satisfied with some degree of certainty only by communication with ANTS-B, it is judged that sufficient reception quality can already be obtained even if transmission from the origin of the handoff (ANTS-A) is stopped. The method of estimating the certainty may be a verification that the judgment result of 603 holds continuously a predetermined number of times or more, or by averaging the judgment result of 603 in the time direction, and verifying that it holds a predetermined number of times or more within a fixed time.

Step 605

ANTS-A which is the origin of the handoff is then instructed to perform soft handoff termination (i.e., communication disconnection).

In ANC, a downlink scheduler operates. The scheduler changes the method of channel allocation according to whether transmission for the corresponding terminal guarantees QoS. Therefore, ANC knows information about QoS beforehand and soft handoff termination conditions are also judged using the information.

In the above, the rate guaranteed for a best effort call in Step 602 may be changed according to the wireless situation or terminal priority.

For example, the guaranteed rate may be changed depending on the device resources of the base station. Since a high user rate for the terminal can be ensured by increasing the guarantee rate when there are sufficient device resources, the serviceability of the system improves. The guarantee rate may be changed based on interference power information measured in the base station. When interference power is large, a shortage of wireless resources can be predicted. The guarantee rate is lowered in such a case, and the system is modified so that more terminals can be connected.

If it is a terminal to which priority should be given, the guarantee rate can also be set higher. In this way, serviceability can be provided according to, for example, a fee system.

In Step 601, the sum total of the possible throughput rate for ANTS-A which is the origin of soft handoff, is compared with a requested sum total rate, and soft handoff forced termination of the soft handoff target ANTS-B (added to the Active Set later) may be determined.

In the case of the first embodiment, to perform soft handoff termination for all carriers of the terminal, the Active Set can be managed for each carrier, or one Active Set can be managed globally for one terminal without managing the Active Sets for each carrier. Further, in the first embodiment and other embodiments, the case was described where there were three carriers, but the invention may also be applied to multiple carriers without limit.

Embodiment 2

Figure 9:
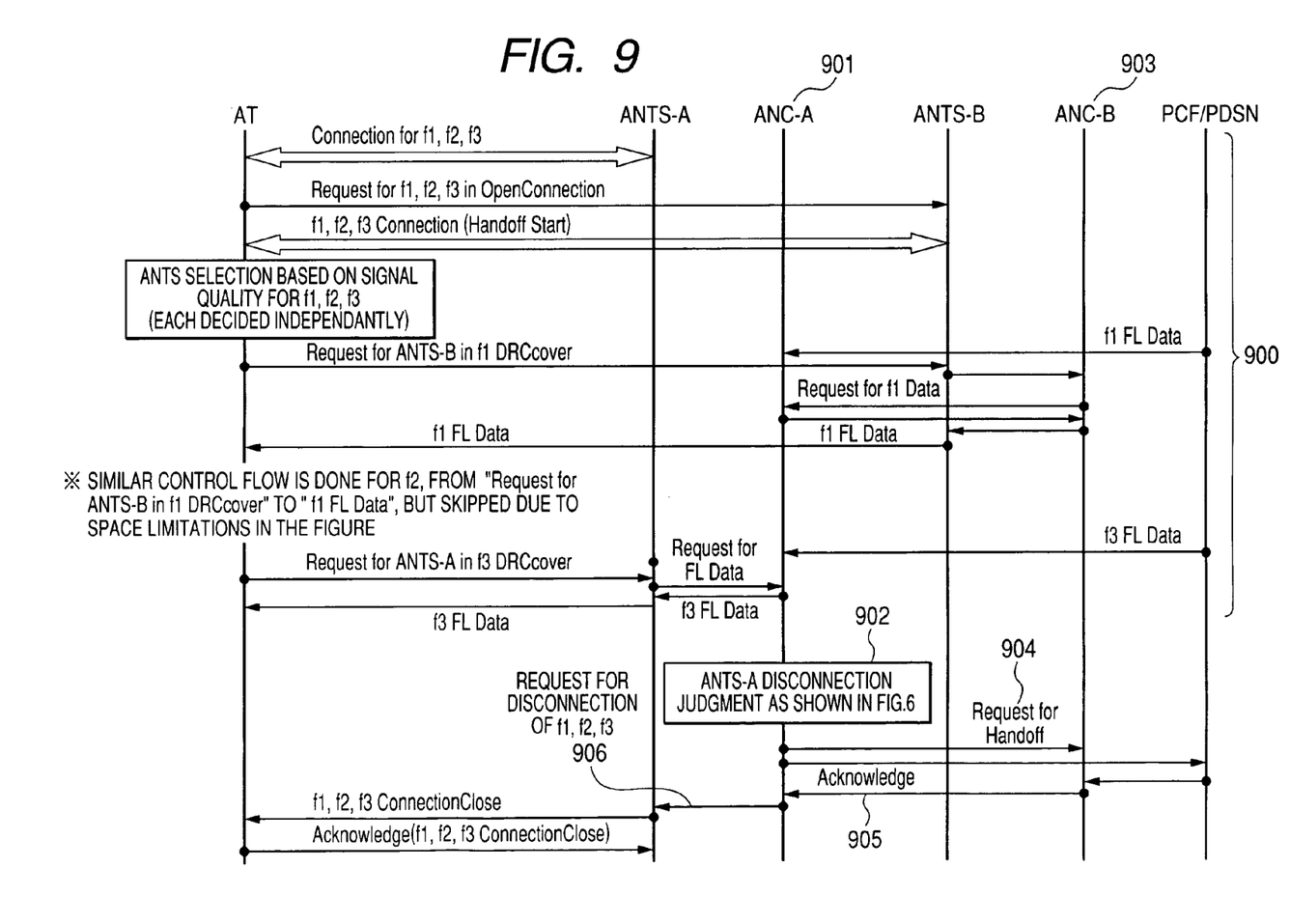
FIG. 9 is a flow chart showing a procedure in the second network configuration according to the second embodiment of the invention.

FIG. 9 shows a flow chart when applying the first embodiment in the aforesaid second network configuration. In this embodiment, as in the first embodiment, a soft handoff termination judgment is made periodically, and a prolonged soft handoff state is avoided while maintaining stability.

Hence, soft handoff is terminated based on the following sequences.

Sequence (900)

It is assumed that there is a soft handoff state at three frequencies (f1, f2, f3). The procedure for this will now be described. These may be in a soft handoff state simultaneously, or may be in a soft handoff state one by one according to the transmission state. This is equivalent to the sequences (401)-(404) described in FIG. 4. The difference is that since ANC in FIG. 4 is divided into multiple parts, data is sent from PCF/PDSN to ANC-A which is the origin of soft handoff until soft handoff is completed, and when soft handoff is completed, the soft handoff target is changed to ANC-B. During soft handoff, when the terminal requests data to be transmitted to the soft handoff target ANTS-B, data is forwarded from ANC-A to ANC-B, and then data is transmitted from ANC-B to the terminal via ANTS-B. The reason for adopting this format is to avoid generating a "disconnection return" between ANC-A and ANC-B.

Sequence (902)

An ANC-A901 in AP-A which is the main element judges whether or not soft handoff termination is feasible.

Sequence (904)

When it is judged to forcibly terminate soft handoff for AP-A, a handoff request message which requires taking over data flow control to this terminal is transmitted from ANC-A to ANC-B 903 in AP-B and PCF/PDSN.

ANC-B which received the handoff request receives data from PCF/PDSN, and makes preparations to forward the data to ANTS-B. PCF/PDSN also makes preparations to route the data already transmitted to AP-A, to AP-B.

Sequence (906)

If an ACK905 which notifies acceptance of a handoff request is returned by ANC-B, ANC-A instructs ANTS-A to disconnect communication with the terminal for all the carriers f1-f3. The operations of ANTS-A and AT which received the disconnection instruction are identical to that of the first embodiment.

Embodiment 3

Figure 7:
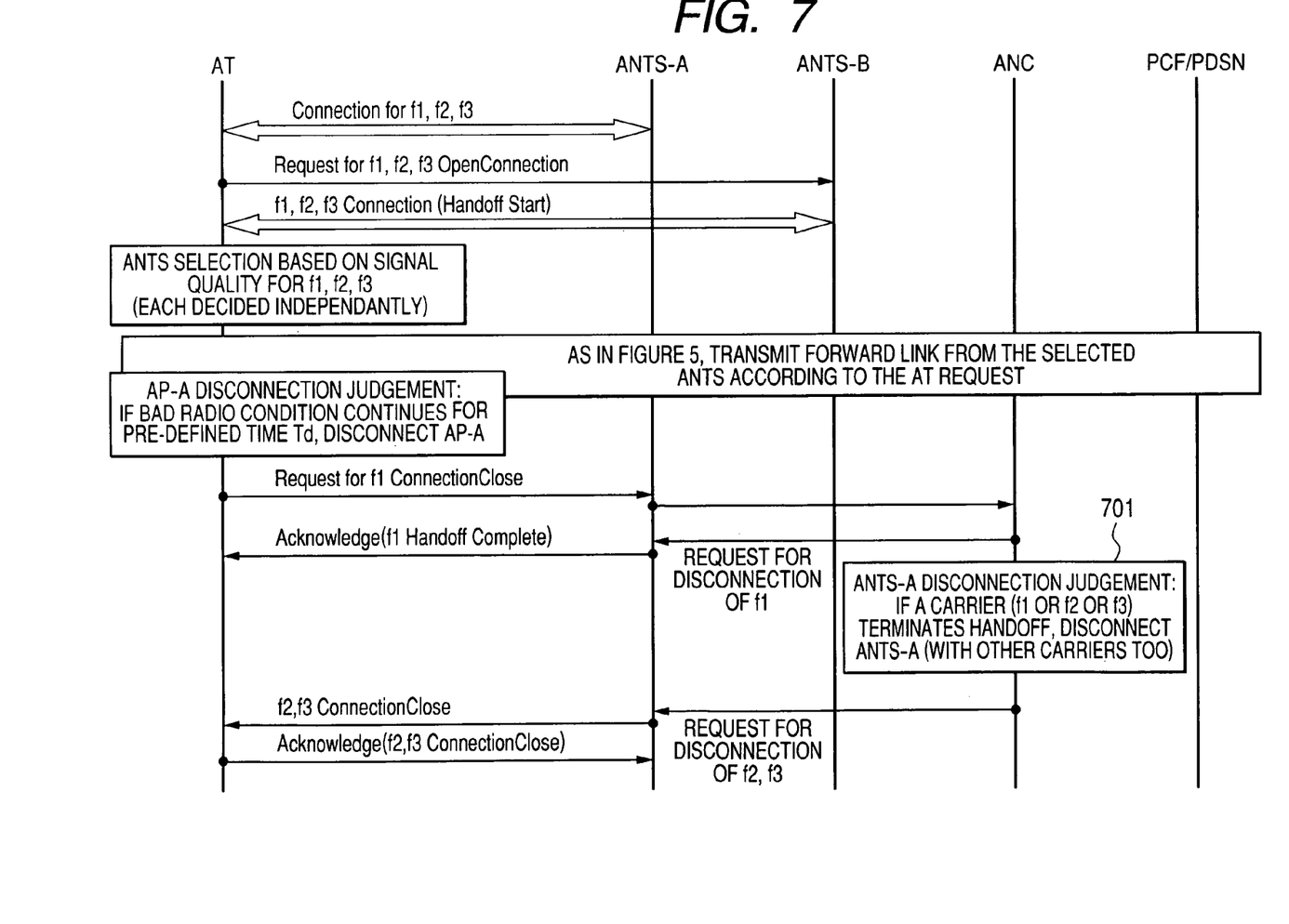
FIG. 7 is a flow chart showing a procedure in the first network configuration according to a third embodiment of the invention.

A third embodiment will now be described referring to FIG. 7. In this embodiment, when a RouteUpdate message for soft handoff termination is received from the terminal for one carrier among multiple carriers (equivalent to sequence 405), the same soft handoff termination judgment is made as in the case of the first embodiment (701). For example, as shown by 500 of FIG. 5, when there is a soft handoff state for all the carriers f1-f3 and an instruction to terminate soft handoff for f1 is notified from the terminal side, it is instructed to terminate soft handoff also for the carriers f2, f3 which are still in the soft handoff state.

Also in this case, by shortening the soft handoff period, operating efficiency of wireless resources can be increased and terminal battery consumption can be reduced. As compared with the case of the first embodiment which periodically judges the feasibility of disconnection of ANTS-A continuously from soft handoff Start, the risk of "disconnection return" occurring can be suppressed low by waiting until soft handoff is terminated for one carrier. Since the judgment period is also shortened, the processing load of ANC is also suppressed.

Embodiment 4

Figure 10:
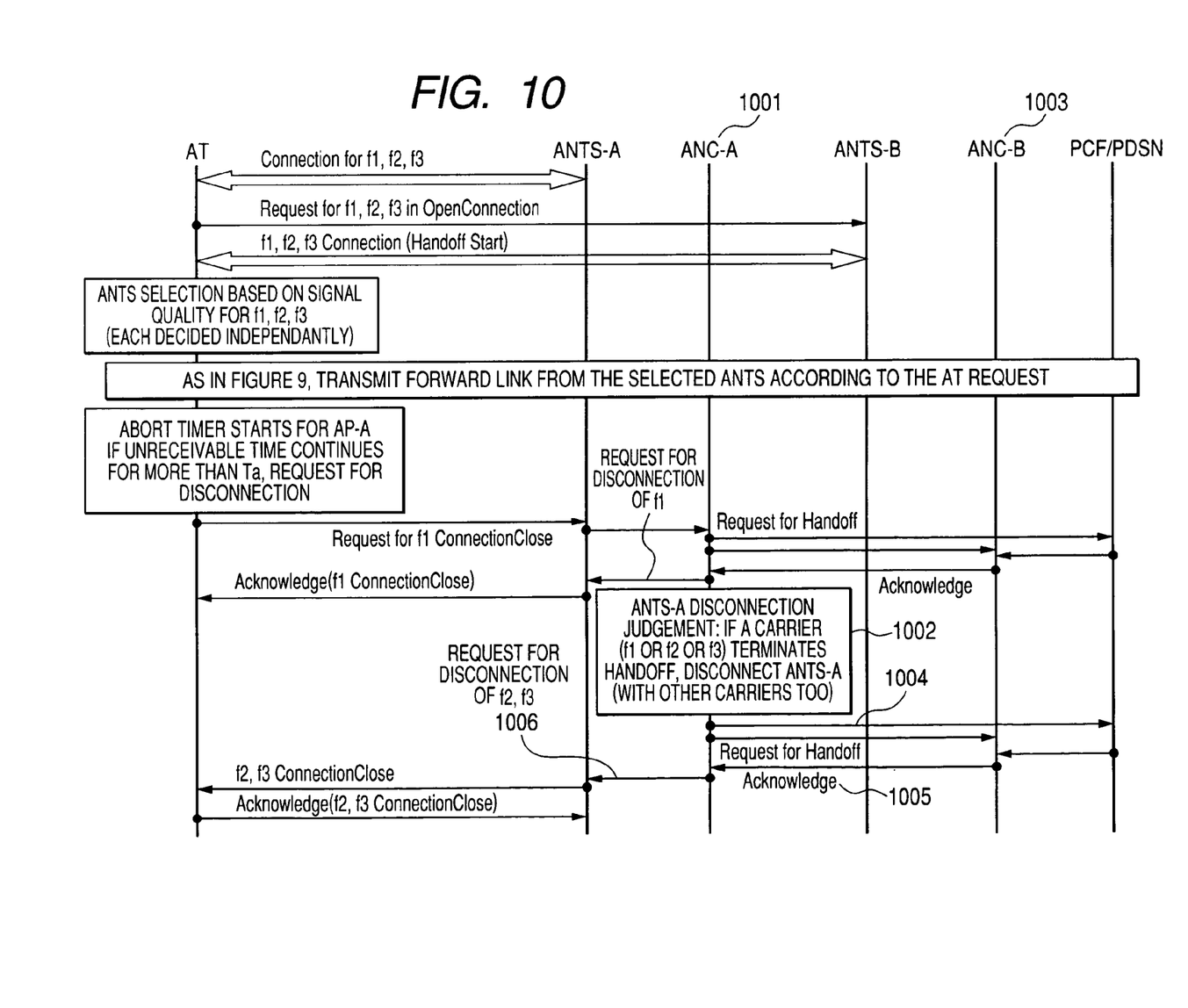
FIG. 10 is a flow chart showing a procedure in the second network configuration according to the fourth embodiment of the invention.

FIG. 10 is a flow chart showing a case where, in the aforesaid second network configuration, a software handoff termination decision preparation is made in the same way as in the third embodiment. As in FIG. 9, an ANC-A1001 of AP-A is the main element which judges the feasibility of soft handoff termination for all the carriers of the terminal based on a notification of soft handoff termination for any one carrier received from the terminal (1002). A handoff request message which requires taking over data flow control to this terminal is transmitted to an ANC-B1003 in AP-and PCF/PDSN (1004). When an ACK1005 which notifies acceptance of the handoff request from ANC-B is returned, ANC-A instructs ANTS-A to disconnect communication with the terminal for all carriers. The operations of ANTS-A and AT which received the communication disconnection instruction are identical to those of the third embodiment.

Embodiment 5

In the first embodiment, soft handoff termination to avoid soft handoff using multiple carriers was described, but even if there is a termination from the soft handoff state, a new RouteUpdate message is issued by the terminal immediately due to the received strength, and there may be a return to the soft handoff state with multiple carriers which would offset the effect of the invention. Therefore, some modification is required also of the part shown by 500 of FIG. 5. The following two methods constitute the fifth embodiment of this patent.

Firstly, control of the RouteUpdate message may be mentioned.

When the terminal is in the soft handoff state, according to the number of carriers to be connected, a threshold in a pilot reception power judgment method for transmitting a RouteUpdate message with a new carrier is changed. For example, when it is not in the present soft handoff state and the pilot received power of a new base station exceeds a threshold 1 in the first carrier, soft handoff in the first carrier is started. Next, when the pilot received power of the new base station exceeds a threshold 2 in the second carrier, soft handoff in the second carrier is started. Next, when the pilot received power of the new base station exceeds threshold 3 in the third carrier, soft handoff in the third carrier is started. The relation between the thresholds at this time is set to be threshold 1<threshold 2<threshold 3. Since suitable threshold values cannot be estimated by the terminal alone, a message which specifies the aforesaid threshold 1, threshold 2, and threshold 3 is broadcast from the base station. Hence, the probability of soft handoff occurring in multiple carriers simultaneously can be controlled by the threshold operation. This solves the problem.

In this embodiment, changing the above-mentioned threshold by QoS or best effort is also within the scope of the invention. A minimum rate is guaranteed by setting the best effort thresholds to have the relation threshold 1<<threshold 2<<threshold 3 (increasing the difference between the thresholds) and for QoS calls, the QoS guarantee is made easier to use by setting threshold 1<threshold 2<threshold 3 (decreasing the difference between the thresholds).

Secondly, there is the method of rejecting the Route Update message. In this embodiment, a Route Update message is often emitted by the terminal, and conversely, the hand off target ANTS is rejected. ANTS temporarily stores the ID of a terminal which performed the soft handoff, and makes connection with a terminal which requires a re-soft handoff within a definite period of time. Due to this, a soft handoff with hysteresis can be performed, and the problem can be resolved for example by combining this with the first embodiment.

Embodiment 6

The composition of ANC in the first network example will now be described using FIG. 11. The ANC has a network interface part 1101 for performing transmission and reception of control messages or communication data exchanged with PCF/PDSN, network interface part 1102 for performing transmission and reception of communication data exchanged with each ANTS, a control part 1103, and a data processing part 1104 which performs processing of communication data. The control part 1103 performs management of the Active Set and performs updating of Active Set information of the terminal which corresponds to reception of a control message during soft handoff start and termination. Transmission/reception control of control messages required for soft handoff start and termination control is also performed, including the soft handoff termination judgment described in FIG. 6. Transmission control for distributing terminal communication data to ANTS is also performed during, before and after soft handoff.

Embodiment 7

The construction of an ANTS in the first network configuration example will now be described referring to FIG. 12. ANTS has a network interface part 1201 for sending and receiving control messages and communication data to and from ANC, a wireless part 1202 for sending and receiving control messages and communication data to and from AT, a control part 1203, and a data processing part 1204 which performs processing of communication data. The control part 1203 has a message interface for communicating the possible terminal reception rate for each carrier which is required for the soft handoff termination judgment described based on FIG. 6, to ANC.

Embodiment 8

Figure 11:
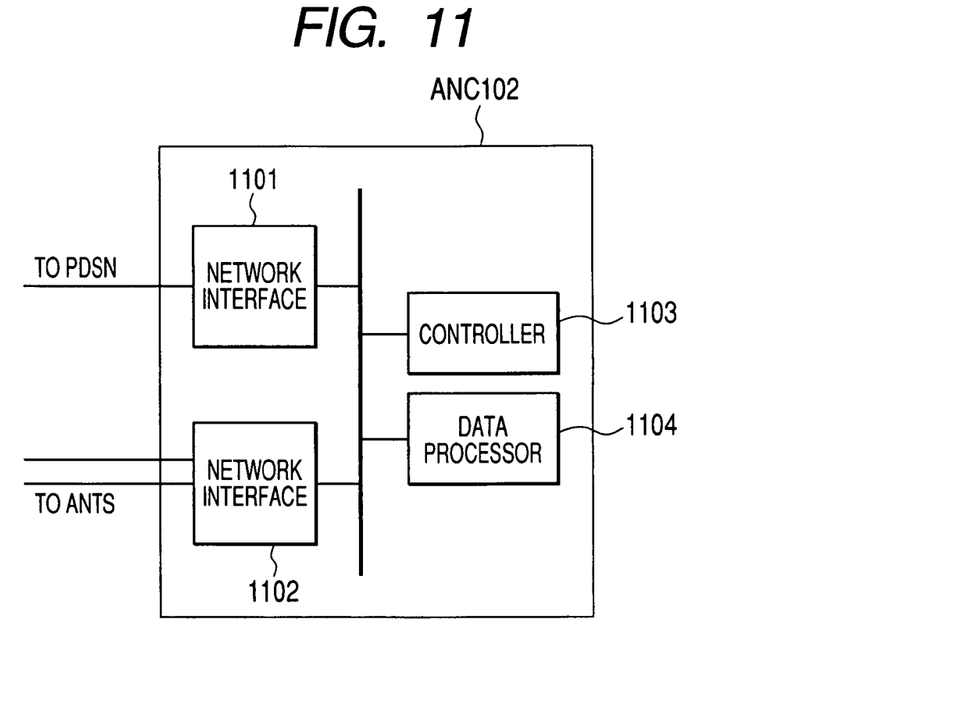
FIG. 11 is a schematic diagram of an ANC in the first network configuration.
Figure 12:
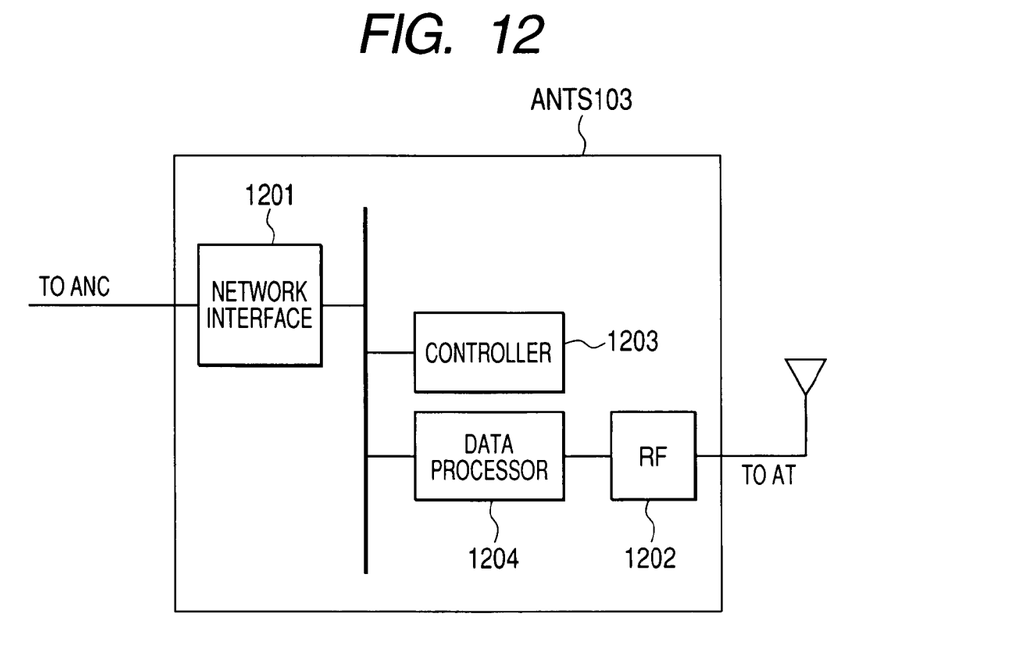
FIG. 12 is a schematic diagram of an ANTS in the first network configuration.
Figure 13:
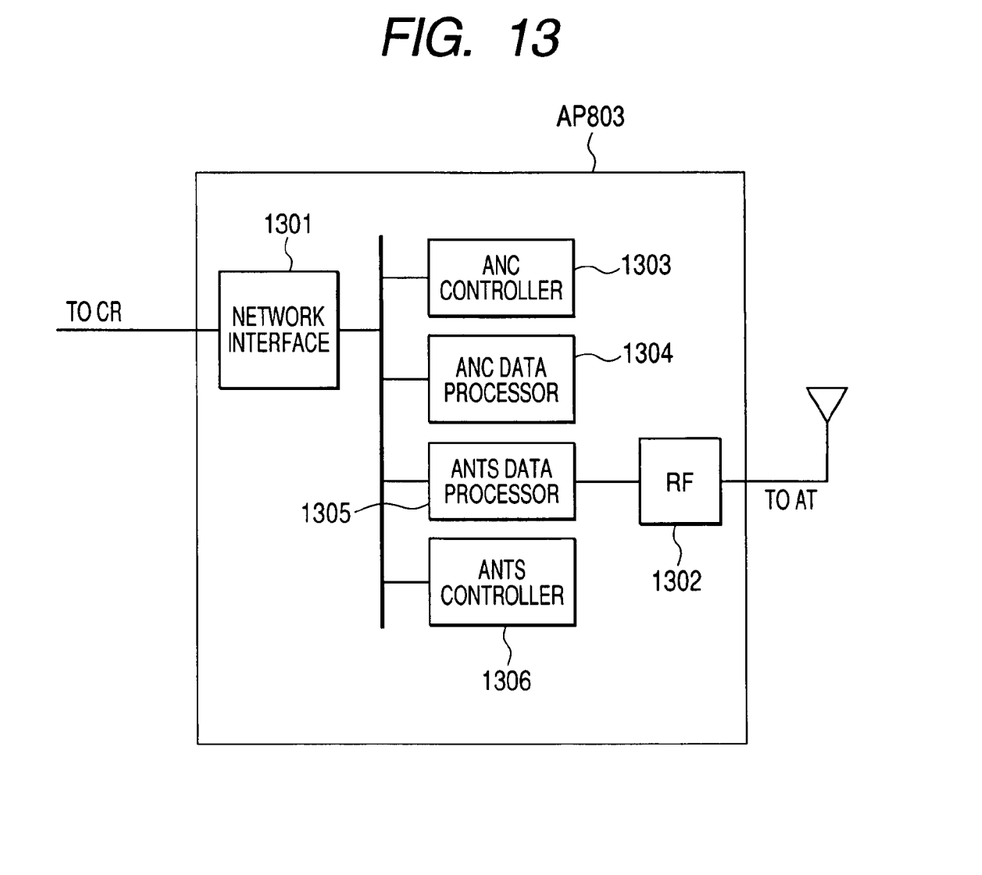
FIG. 13 is a schematic diagram of an AP in the second network configuration.

AP in the second example of a network configuration has the function of the ANC of FIG. 11 and ANTS of FIG. 12 in one case. Specifically, as shown in FIG. 13, it has a network interface part 1301 for sending/receiving control messages and communication data to and from CR, wireless part 1302 for sending/receiving control messages and communication data to and from AT, ANC control part 1303 which has the same functions as the ANC control part and data processing part of FIG. 11, ANC data processing part 1304, ANTS control part 1305 which has the same functions as the ANTS control part and data processing part of FIG. 12, and ANTS data processing part 1306. The operating functions of each of the parts 1303-1306 are essentially identical to those of the corresponding parts in FIGS. 11 and 12. However, if this AP is the origin of the hand off, the ANC performs control for forwarding communication data addressed to a terminal to the ANC of the target AP via CR. When this AP is the handoff target, control which receives forwarding of communication data addressed to the terminal from the ANC of the AP which is the origin of the hand off via CR, is performed. The ANC control part also performs processing of control messages for handoff between AP.

What is claimed is:

1. A wireless communications system comprising multiple base stations connected to a network, communication with a terminal being performed using multiple carriers, and a soft handoff of said terminal being performed among said multiple base stations, wherein when said terminal is in a soft handoff state between said first and second base stations, said first base station and second base station receive communication quality information about said multiple carriers from said terminal, wherein a termination message of a network side soft handoff which instructs termination of soft handoff of at least a second carrier to be determined based on the received communication quality information about at least a first carrier, is notified to said terminal from said first or second base station.

2. The wireless communications system according to claim 1, having a control node connected between said multiple base stations and a communication network, wherein said communication quality information is information about a data rate obtained by any of the base stations in each carrier, and wherein when a data rate for all the carriers of this terminal obtained from said first or second base station exceeds a predetermined request rate, said control node makes a judgment to terminate soft handoff for said second or first base station and for all carriers.

3. The wireless communications system according to claim 2, wherein said predetermined request rate is a QoS rate of this terminal or a best effort guarantee rate determined by each base station.

4. The wireless communications system according to claim 1, having a control node connected between said multiple base stations and said a communication network, wherein when said first base station has received a terminal side soft handoff termination message for said first carrier from said terminal, said control node makes a judgment to terminate soft handoff also for said second carrier.

5. The wireless communications system according to claim 1, wherein said communication quality information is information about a data rate obtained by any of the base stations in each carrier, wherein when the base station is the base station which is the origin of the handoff, said first base station forwards communication data to a terminal received from the network to said second base station, and wherein when a data rate for all the carriers of the terminal concerned obtained from said first or second base station exceeds a predetermined request rate, a judgment to terminate soft handoff of said second or first base station for all the carriers is made.

6. The wireless communications system according to claim 5, wherein said predetermined request rate is a QoS rate of said terminal or a best effort guarantee rate determined by each base station.

7. The wireless communications system according to claim 1, wherein when the base station is the base station which is the origin of the handoff, said first base station forwards communication data addressed to the terminal received from the network to said second base station, and wherein when said first base station receives a terminal side soft handoff termination message which notifies termination of soft handoff for said first carrier from said terminal, a judgment to terminate soft handoff also for said second carrier is made.

8. The wireless communications system according to claim 1, wherein after notifying said termination message of a network side soft handoff for said first or second base station to said terminal, a request which adds said first or second base station from this terminal to an Active Set is refused according to predetermined conditions.

9. The wireless communications system according to claim 1, wherein, in a pilot received power determining method for soft handoff start in this terminal, there is a first threshold which is a soft handoff start condition in the first carrier, a second threshold which is a condition starting soft handoff in the second carrier while there is already soft handoff in the first carrier, and a third threshold which is a condition starting soft handoff in the third carrier while there is already soft handoff in the first carrier and second carrier, the magnitudes of said thresholds being set in the order:

first threshold<second threshold<third threshold.

10. The wireless communications system according to claim 9, wherein the values of the threshold 1, threshold 2, and threshold 3 can be changed, and there is a message interface which connects the values from this base station to this terminal.

11. The wireless communications system according to claims 9, wherein the values of the threshold 1, threshold 2, and threshold 3 are distinguished by whether this terminal is communicating by a QoS call, or communicating by a best effort call, and different values are set accordingly.

12. The wireless communications system according to claim 1, wherein, in a pilot received power determining method for soft handoff start in this terminal, there is a first threshold which is a soft handoff start condition in the first carrier, a second threshold which is a condition starting soft handoff in the second carrier, and a third threshold which is a condition starting soft handoff in the third carrier, a magnitude relation between these thresholds being set based on the frequency characteristic of a band to which each carrier belongs, the number of connectors belonging to the area used and their communication throughput, and the QoS preference in the area used.

* * * * *